United States Patent
Ocker et al.

(10) Patent No.: US 6,817,600 B2
(45) Date of Patent: Nov. 16, 2004

(54) AIR SPRING SYSTEM FOR A MOTOR VEHICLE

(75) Inventors: Oliver Ocker, Altdorf (DE); Matthias Römer, Altdorf (DE); Hans Scheerer, Esslingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/445,576

(22) Filed: May 27, 2003

(65) Prior Publication Data

US 2003/0218281 A1 Nov. 27, 2003

(30) Foreign Application Priority Data

May 25, 2002 (DE) ......................................... 102 23 405

(51) Int. Cl.[7] ............................................... B60G 9/04
(52) U.S. Cl. ............................... 267/274; 280/124.157
(58) Field of Search .............................. 267/4.28, 64.11, 267/274; 280/124.16, 5.514, 124.157, 6.15, 6.157, 124.158, 124.159, 124.161

(56) References Cited

U.S. PATENT DOCUMENTS

| | | | | |
|---|---|---|---|---|
| 5,452,919 A | * | 9/1995 | Hoyle et al. ............. | 280/5.514 |
| 5,466,007 A | * | 11/1995 | Smith ....................... | 280/6.157 |
| 6,189,903 B1 | * | 2/2001 | Bloxham ................ | 280/124.16 |
| 6,332,623 B1 | * | 12/2001 | Behmenburg et al. . | 280/124.16 |
| 6,354,617 B1 | * | 3/2002 | Behmenburg et al. ... | 280/124.157 |
| 6,685,174 B2 | * | 2/2004 | Behmenburg et al. ... | 267/64.28 |

FOREIGN PATENT DOCUMENTS

| | | |
|---|---|---|
| DE | 198 35 491 | 2/2001 |
| DE | 100 04 880 | 8/2001 |

* cited by examiner

*Primary Examiner*—Robert A. Siconolfi
*Assistant Examiner*—Melanie Torres
(74) *Attorney, Agent, or Firm*—Klaus J. Bach

(57) ABSTRACT

In an air spring system of a motor vehicle having a pressure line extending between a compressor and a pressure storage or air springs of the motor vehicle, the pressure line includes a section between a dryer and the air springs with a variable flow cross-section and with one electromagnetically actuable switching valve arranged in parallel with the variable flow cross-section and providing unrestricted flow when opened.

7 Claims, 3 Drawing Sheets

AIR SPRING SYSTEM FOR A MOTOR VEHICLE

BACKGROUND OF THE INVENTION

The invention relates to an air spring system for a motor vehicle including a compressor supplying compressed air by way of an air dryer to a compressed air storage chamber and to individual air springs by way of vehicle level control valves.

An air spring system of this type is known from DE 198 35 491 A1. When the vehicle body is being lowered, switching valves assigned directly to the vehicle wheels and a further switching valve are electromagnetically actuated by means of a control unit, with the result that a line which originally is connected to the atmosphere is connected to the pressure line. The increase in pressure obtained thereby in this line opens a switching valve which is arranged parallel to a non-return valve, so that air can be discharged from the air springs.

It is the object of the present invention to provide an air spring system for motor vehicles in which air can be quickly discharged from the springs when necessary.

SUMMARY OF THE INVENTION

In an air spring system of a motor vehicle having a pressure line extending between a compressor and a pressure storage or air springs of the motor vehicle, the pressure line includes a section between a dryer and the air springs with a variable flow cross-section and with one electromagnetically actuable switching valve arranged in parallel with the variable flow cross-section and providing unrestricted flow when opened.

The basic idea of the invention is to provide a section of the pressure line between a dryer connected downstream of the compressor and the level control valves of the air springs with a variable flow cross section for the gas flow. The rate at which the air is discharged via the level control valves when the vehicle level is lowered can be adjusted by means of this variable flow cross section, which acts as a throttle. The maximum flow cross section is in his case selected to be smaller than the flow cross section of the switching valve which blocks the vent line. As a result, the compressed air is throttled in the pressure line section before flowing through the dryer. The throttling causes the relative humidity of the air to decrease, with the result that the expanded air, as it flows through the dryer, is able to take up the atmospheric moisture which has collected there whereby the dryer is regenerated. The dryer dehumidifies the compressed air, for example by means of a gel which collects the moisture from the air.

The pressure line section has a non-return valve which is arranged in parallel with the throttle of variable cross section. This non-return valve prevents air flow in the direction toward the dryer but opens for supplying air compressed by the compressor to the air springs or to a pressure reservoir. As a result, the throttle can be bypassed and in this way the power needed for operating the compressor can be lower so that also the compressor may be smaller. The variable flow cross section of the throttle may also be increased to its maximum during compressor operation.

A further possible way of widening the flow cross section in the pressure line section is provided by a configuration of the invention, in which a switching valve, for example an electromagnetic switching valve, is arranged in parallel with the throttle, the switching valve closing or opening a bypass passage to the throttle. As a result, when it becomes necessary to lower the vehicle body quickly, the throttle can be effectively bypassed.

In a particular embodiment of the invention the switching valve includes a throttle such that, in its closed position the switching valve can act as a throttle in the pressure line and in its operating position can provide for a virtually non-throttled pressure line.

By means of joint electronic actuation of both the electromagnetic switching valve of the pressure line section and that of the vent line, it is possible to implement a simple and inexpensive configuration of the invention. By way of example, both switching valves can be actuated by means of the same output stage of a control unit, with the result that an additional output stage is not necessary. For this purpose, the switching valve of the pressure line section is switched already by a low excitation current or a low voltage, whereas the switching valve of the vent line is switched only at a higher excitation current or a higher voltage. For normal lowering of the vehicle body at a relatively low lowering rate, the control unit actuates only the switching valve of the vent line whereby the air is discharged via the throttles in the pressure line section, the dryer and the vent line. If it is necessary to lower the vehicle body more quickly, both switching valves are actuated by a higher excitation voltage or a higher excitation current, so that in addition to the switching valve of the pressure line section the switching valve of the, vent line is also opened. The air can then bypass the throttled pressure line section via the vent line.

In an embodiment which is very favorable in terms of energy use the switching valve in the vent line is a pressure-controlled switching valve. In this case, the actuator of the valve is on one side subjected to the pressure prevailing in the vent line, so that the valve opens automatically at a defined over-pressure. On the other side, the pressure of a pilot line, which can be connected to the pressure line via an electromagnetic pilot valve, acts on the actuator of the valve. As a result of the pilot valve being actuated and switched by means of the only output stage of the control unit, which also controls the valve in the pressure line section, the pressure prevailing in the pressure line opens the switching valve of the vent line. Consequently, a lower electrical power is required to open the switching valves in the vent line.

In a further embodiment the vent line is in communication with the intake line. This embodiment represents a variant which is very advantageous for acoustic reasons, in particular if the vent line is connected to the intake line between intake filter and compressor in the intake line.

Various embodiments of the invention will be described below with reference to the accompanying drawings. Throughout all the figures, identical components are provided with identical reference symbols.

DESCRIPTION OF PREFERRED EMBODIMENTS

Figure 1:
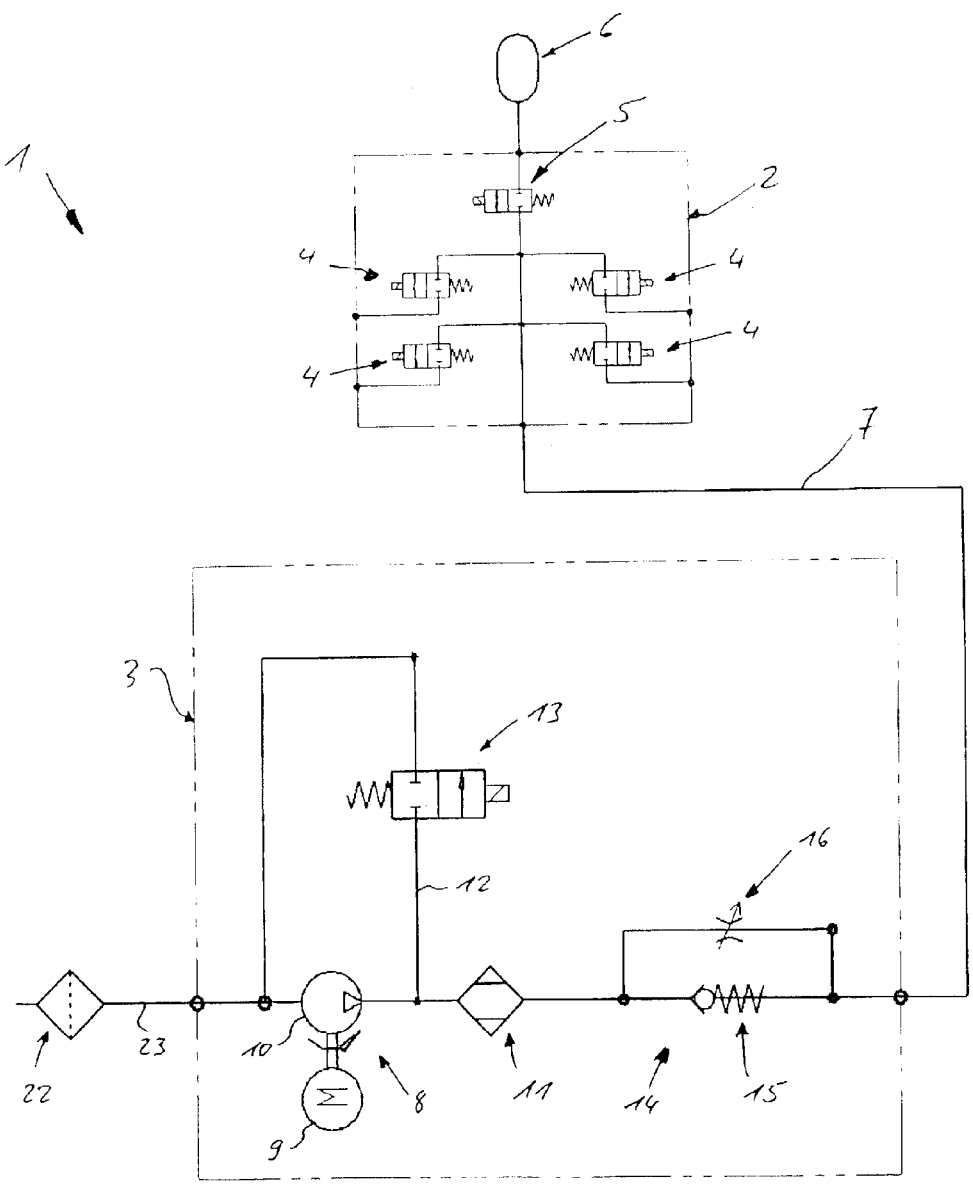
FIG. 1 diagrammatically depicts an air spring control system according to the invention.

FIG. 1 illustrates an air spring system 1 which includes a valve block 2 and a compressor unit 3. The valve block 2 includes a plurality of level control valves 4, which are each able to establish and interrupt communication between a pressure line 7 wheel and air springs 41 of a motor vehicle. The valve block 2 also includes a switching valve 5 which can connect a pressure storage 6 to the pressure line 7.

The compressor unit 3 includes a compressor 8 comprising an electric motor 9 and compression means 10, as well as a dryer 11 and a vent line 12 with shut-off switching valve 13. A section 14 of the pressure line 7 between the dryer 11 and the valve block 2 includes a non-return valve 15, which prevents a pressurized gas flow from the air springs towards the dryer 11, and a throttle 16, which is arranged in parallel with the nonreturn valve 15 and may have a variable flow cross section. The vent line 12 represents a bypass line around the compressor 10 and extends from an area between the pressure-side of the compressor 8 and the dryer 11 to an area behind a filter 22, where it is connected to the intake line 23.

To lower the vehicle body, both the level control valves 4 and the shut-off switching valve 13 are actuated and opened by a control unit C. In the process, the effective flow cross section of the throttle 16 is set in such a way that, on the one hand, the gas or air mass to be discharged for lowering the vehicle body can be discharged within the required time. On the other hand, this air mass, which is under pressure, is throttled to a sufficiently great extent, so that by its expression the relative humidity of the air is substantially reduced. This ensures that the expanded air, as it passes through the dryer 11, is able to take up the moisture which has been collected therein and therefore regenerates the dryer 11. The shut-off switching valve 13 has a low throttle resistance and a larger flow cross section than is provided in the section 14 of the pressure line 7.

When the desired pressure level has been reached, the switching valves 4, 13 are closed again. The rate at which the vehicle level is lowered can be influenced by the flow cross section of the throttle 16 and the rate at which the flow cross section of the throttle 16 is changed.

Figure 2:
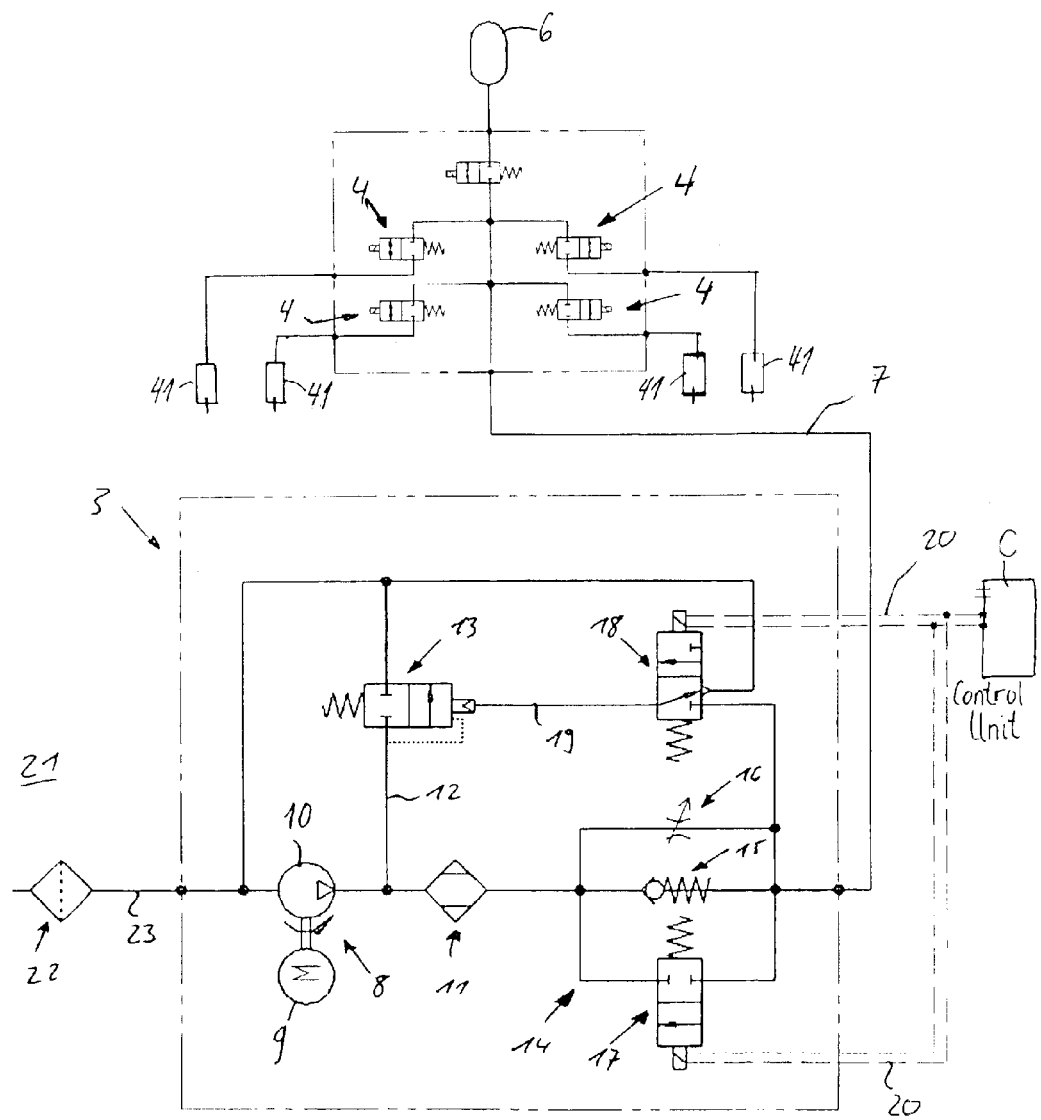
FIG. 2 shows an air spring control system corresponding to that shown in FIG. 1, but with an additional switching valve in the pressure line section.

In FIG. 2, the pressure line section 14 has, in comparison with FIG. 1, an additional electromagnetic switching valve 17 connected in parallel. Also, the compressor unit 3, unlike in FIG. 1, includes a pilot valve 18, which in the switched state allows the pressure prevailing in the line 7 to act on an actuator of the shut-off valve 13 via a pilot line 19. The actuators of the switching valve 17 and of the pilot valve 18 are connected, via electrical control lines 20, to the same output stage of the control unit C.

To lower the vehicle body, in addition to the level control valves 4, the actuator of the pilot valve 18 is acted on by a relatively low voltage or a low energization current via the electric control line 20. As a result, the correspondingly designed pilot valve 18 is switched and provides for communication between the line 7 and the pilot line 19. Then, the pressure prevailing in the line 7 acts on the actuator of the shut-off switching valve 13. This pressure rise causes the shut-off switching valve 13 to be switched open and to provide for communication between the vent line 12 and the atmosphere 21 via the intake line 23 and the filter 22, so that the excess air mass can escape via the pressure line 7, the throttle 16, he dryer 11, the vent line 12 and the intake line 23. Since the opening of the required large flow cross section in the shut-off switching valve 13 is performed by means of the pressure prevailing in the pressure line 7, this embodiment is highly advantageous in energy terms, especially since the relatively small cross section required in the pilot valve 18 can likewise be opened with little consumption of energy.

If the vehicle body needs to be lowered very quickly, for example when an off-road vehicle is moving from off-road operating conditions (high vehicle body for a high ground clearance with low vehicle speeds) to road driving conditions (low center of gravity in order to avoid unstable driving states at higher vehicle speeds), both the pilot valve 18 and the switching valve 17 are acted on by a higher voltage or a higher energization current from the output stage of the control unit C via the control line 20. As a result, in addition to the pilot valve 18 the switching valve 17 is also switched and opens up a bypass which bypasses the throttle 16. Together with the throttle 16, the pressure line section 14 therefore has a flow cross section which is increased compared to the state in which the switching valve 17 is blocked, resulting in a rapid lowering of the level of the vehicle body.

Figure 3:
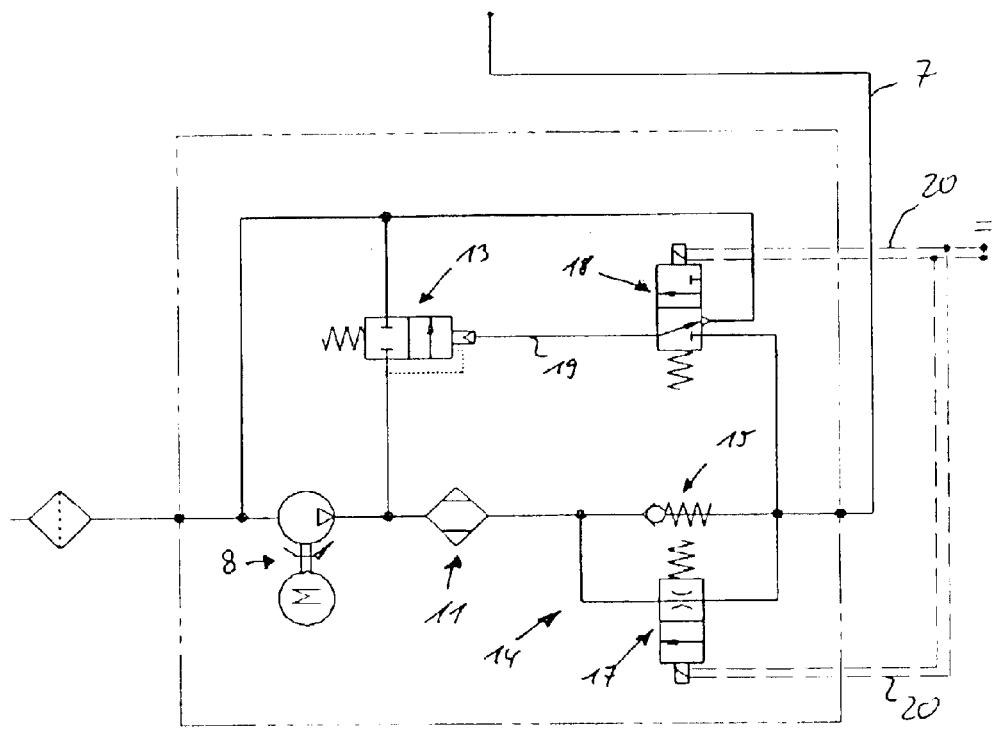
FIG. 3 shows, in a partial illustration in accordance with FIG. 2, another embodiment of the switching valve.

FIG. 3 illustrates an alternative embodiment of the invention, in which the switching valve 17 is designed as a throttle valve and therefore in the non-switched normal state performs the function of the throttle 16 shown in FIG. 2.

Figure 4:
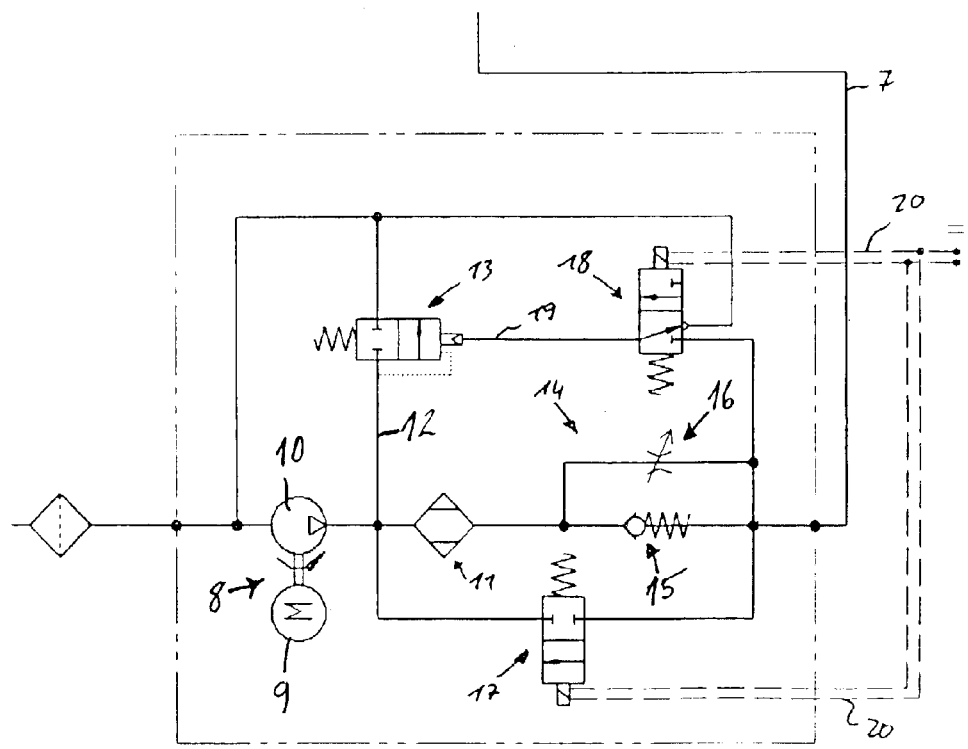
FIG. 4 shows an alternative embodiment of the invention including by-pass lines for the throttle and dryer.

FIG. 4 illustrates an embodiment, in which the switching valve 17 not only provides for a bypass around the non-return valve 15 and the throttle 16, but also, in addition, around he dryer 11. Therefore, in the event of a rapid level lowering, it is also possible to bypass the dryer 11 in order to eliminate its flow resistance. In this case, however, the dryer is not regenerated.

For the sake of completeness, it should also be noted that, to raise the vehicle body, the compressed gas or air stored in the storage 7 is supplied to the air springs 41 via the switching valve 5 and the level control valves 4 until the desired level is reached. Then, the level control valves 4 and the switching valve 5 are closed again. In the event of the pressure dropping below a predetermined pressure in the storage 6, the compressor 8 sucks in air from the atmosphere 21 via the intake line 23 and the filter 22 and forces the compressed air through the dryer 11, the pressure line section 14 and the switching valve 5 into the storage 6. In the process, the nonreturn valve 15 opens and thereby allows a virtually non-throttled connection between the dryer 11 and the storage 6. It is also conceivable for the air springs 41 to be charged directly via the compressor 6, but to achieve the desired reaction times the compressor would have to be dimensioned to be very powerful for peak load conditions.

What is claimed is:

1. An air spring system of a motor vehicle, comprising
   an air compressor (8) for taking in air from the atmosphere (21) via an intake line (23) and compressing the air,
   a dryer (11) arranged downstream of the compressor (8) for dehumidifying the air compressed in the compressor (8),
   a storage (6) in communication with the compressor (8) by a pressure line (7) for storing the dried compressed air supplied by the compressor (8),
   level control valves (4) for controlling the flow of compressed air to, and from, individual vehicle wheel air springs (41), said air springs (41) being connected to said pressure line (7) by way of said level control valves (4)
   a vent line including a shutoff valve (13) by means of which the pressure line (7) can be connected to atmosphere in such a manner that this connection can be blocked off by the shutoff switching valve (13), a throttle (16) with a variable flow cross section arranged in a section (14) of the pressure line between the dryer and the level control valves for throttling the air released from the pressure line (7) before it is conducted back through the dryer (11) for reconditioning the dryer (11), a non-return valve (15) arranged in parallel with the variable flow cross-section throttle valve (16) and an electromagnetically actuable switching valve (17) arranged in the section (14) of the pressure line (7) in parallel with the variable flow cross-section throttle (11) and the non-return valve (15) for rapidly releasing air from the pressure line (7) when rapid lowering of the motor vehicle is necessary.

2. An air spring system according to claim 1, wherein the variable flow cross-section throttle (16) is integrated in the switching valve (17) in the pressure line section (14).

3. An air spring system according to claim 1, wherein the switching valve (17) in the pressure line section (14) and the shutoff switching valve (13) in the vent line (12) are operable by way of a common output stage of a control unit (C).

4. An air spring system according to claims 3, wherein the shutoff switching valve (13) of the vent line (12) is switched at a lower energization current or a lower voltage than the switching valve (17) of the pressure line section (4).

5. An air spring system according to claim 4, wherein the shutoff switching valve (13) of the vent line (12) is a pressure-controlled switching valve, which can be controlled by the line pressure prevailing between the air springs and the pressure line section (14) via an electromagnetic pilot valve (18), which can be actuated by the output stage of the control unit which also controls the switching valve (17) of the pressure line section (14), and which controls the application of the pressure prevailing between the compressor (8) and dryer (11) to the shutoff switching valve (13).

6. An air spring system according to claim 1, wherein the switching valve (17) is arranged in parallel with the variable flow cross-section throttle (16) and the dryer (11) for bypassing both the throttle (16) and the dryer (11).

7. An air spring system according to claim 1, wherein the vent line (12) is connected to the intake line (23).

* * * * *